(No Model.)
H. W. MUNSEY.
ATTACHMENT FOR BEDSTEADS.
No. 379,409. Patented Mar. 13, 1888.
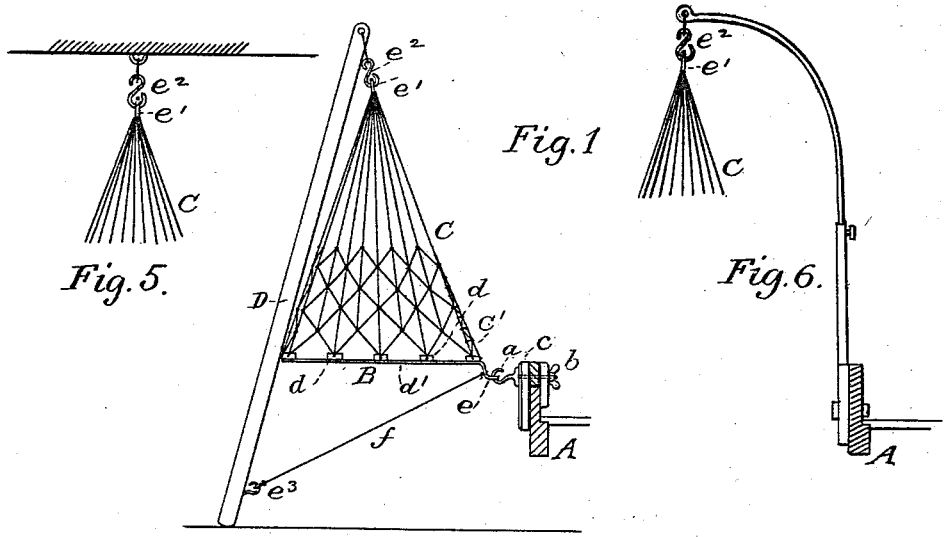
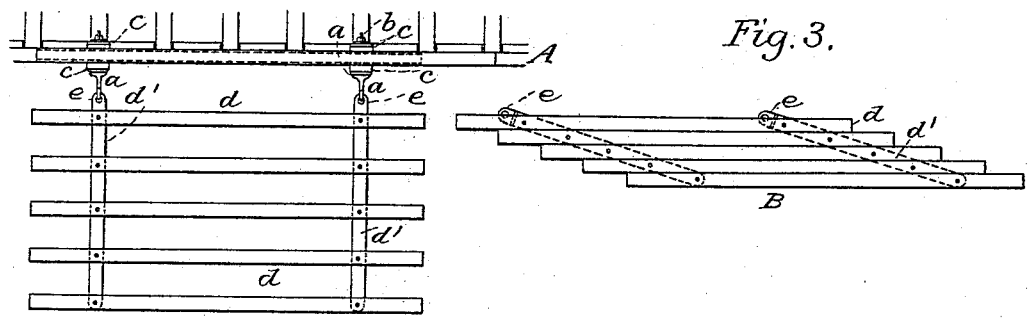
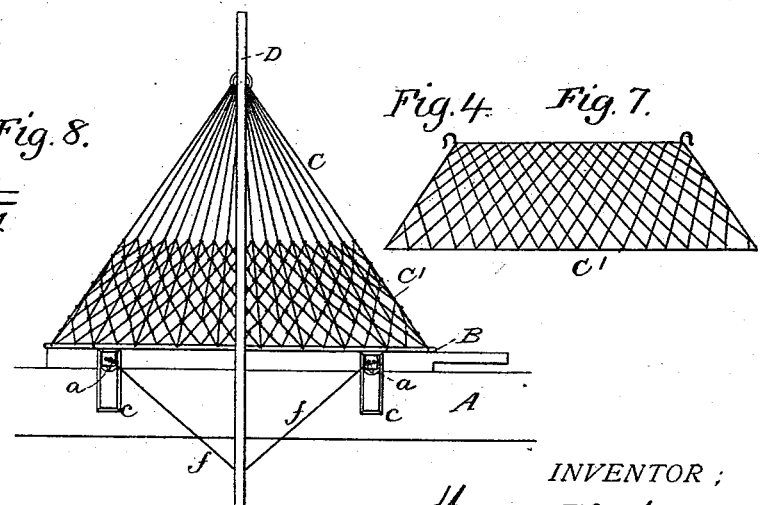
WITNESSES:
A. Ruppert
Geo. F. Flint
INVENTOR:
Horace W. Munsey,
by Howard T. Howard
ATTORNEYS.

UNITED STATES PATENT OFFICE.

HORACE W. MUNSEY, OF CHESTER, PENNSYLVANIA.

ATTACHMENT FOR BEDSTEADS.

SPECIFICATION forming part of Letters Patent No. 379,409, dated March 13, 1888.

Application filed September 5, 1887. Serial No. 248,849. (No model.)

*To all whom it may concern:*

Be it known that I, HORACE W. MUNSEY, of Chester, in the county of Delaware and State of Pennsylvania, have invented certain new and useful Improvements in Attachments for Bedsteads, of which the following is a specification, reference being had to the accompanying drawings, and to the letters of reference marked thereon.

My invention relates to a crib attachment to a bedstead, as hereinafter specified, the object being to provide a device used with a bedstead, preferably for the occupancy of a child, so that it may be within reach of a person occupying the bed.

In the accompanying drawings, Figure 1 is a vertical side or end elevation of my invention, showing the invention suitably supported and attached to the side of a bedstead. Fig. 2 is a plan of a feature of my invention. Fig. 3 is also a plan of the same feature, showing it compressed or folded. Fig. 4 is a vertical front elevation of Fig. 1. Figs. 5, 6, and 8 are modifications of parts of my invention; and Fig. 7 is a detached detail.

Similar letters of reference indicate similar parts in the respective figures.

A represents the side of an ordinary bedstead, to which hooks $a$ may be secured in any suitable manner. I preferably clamp them to the side of the bedstead, as shown, the ends of the hooks being threaded and provided with thumb-nuts $b$. Suitable intervening pieces or washers, $c$, may be used; but I do not confine myself to any special mode of attaching the hooks to the side of the bedstead, as they may be permanently attached, as shown in Fig. 8, or made removable, as desired.

B represents a slatted crib-bottom, consisting of longitudinal slats $d$, preferably hinged or pivoted to metallic cross-bars $d'$, each of which is provided with an eye, $e$, adapted to fit over one of the hooks $a$, as shown in Figs. 1 and 2. The slatted crib-bottom B, when thus made, is adapted to be folded, as shown in Fig. 3, when removed from the hooks; but the bottom may be made rigid, if desired. To the bottom B is attached by any suitable means the hammock-crib C, certain cords of which are suitably attached to the slats, as shown in Fig. 1. The cords are so arranged that access may be conveniently had to the interior of the crib from the side next to the bedstead. That side of the hammock, if desired, may be provided with a separate woven section, C', (see Fig. 7,) adapted to be hooked to or upon the main hammock. The cords from the hammock-crib are run together at the top, where an eye or hook, $e'$, is provided.

D is a pole or standard, the foot of which rests upon the floor of the apartment, while at its head or top is a hook, $e^2$, to which the eye $e'$ of the hammock-crib is attached. Near the foot of the pole or standard D is a hook, $e^3$, to which cords $f$ are secured leading to the ends of the cross-bars $d'$, as shown in Figs. 1 and 4, whereby the hammock-crib when in position may be securely braced.

I do not confine myself to the means herein shown and above described of suspending the hammock-crib, as it may hang from the ceiling or be sustained in any known way—as, for instance, from a standard secured to and extending vertically from the bedstead. The standard, if necessary, may be made adjustable in height. (See Fig. 6.)

It will be seen that the hammock-crib forms a convenient attachment to a bedstead, and that the person occupying the bed can readily reach to and within the crib. Thus a useful device is provided for the use of mothers who desire to have their infants or children sleep within convenient reach of them.

The hammock-crib may be readily detached from its support and the bedstead and folded, as shown in Fig. 3, and when not in use the whole may be conveniently folded up and placed under the bed, or disposed of in any other way. It will be understood, however, that the hammock-crib may be folded while still attached to the bedstead, and that when so disposed, and with the cords wrapped about it, it will occupy but little space. The pole can be conveniently placed out of the way.

Having described my invention, I claim—

1. The combination, with a bedstead, of a slatted bottom attached to one side thereof, netting secured to the slatted bottom, and a suitable support to which certain cords from said netting, when drawn together to one point, are also attached, substantially as specified.

2. The combination, with a bedstead, of cross-bars attached to one side thereof, a series of slats pivoted to said cross-bars, netting secured to said slats, and a suitable support to which certain cords from the netting, when drawn together to one point, are also attached, whereby the slatted bottom is supported in a horizontal position, substantially as specified.

3. The combination, with a bedstead, of a slatted bottom, netting secured to the slatted bottom, a suitable support to which certain cords from said netting, when drawn together to one point, are also attached, and an independent section of netting attached to one side of the main netting and made removable to give access to the interior, substantially as specified.

In testimony whereof I have hereunto set my hand and seal.

HORACE W. MUNSEY. [L. S.]

Witnesses:
WM. H. BERRY,
HERBERT C. MUNSEY.